(12) United States Patent
Pomposo Alonso et al.

(10) Patent No.: US 8,294,226 B2
(45) Date of Patent: Oct. 23, 2012

(54) POLYTHIOPHENE-BASED LARGE SURFACE DISTRIBUTED PRESSURE SENSORS

(75) Inventors: Jose Adolfo Pomposo Alonso, San Sebastian (ES); Estibalitz Ochoteco Vaquero, San Sebastian (ES); Hans-Jürgen Grande Telleria, San Sebastian (ES); Fernando Martinez Rodriguez, Arrasate-Mondragon (ES); Gregorio Obieta Zubieta, Arrasate-Mondragon (ES)

(73) Assignees: Fundacion Cidetec, San Sebastian (Guipuzcoa) (ES); S. Coop Ikerlan, Arrasate-Mondragon (Guipuzcoa (ES)

( * ) Notice: Subject to any disclaimer, the term of this patent is extended or adjusted under 35 U.S.C. 154(b) by 1319 days.

(21) Appl. No.: 12/013,863

(22) Filed: Jan. 14, 2008

(65) Prior Publication Data

US 2008/0135310 A1    Jun. 12, 2008

Related U.S. Application Data

(63) Continuation of application No. PCT/ES2006/000398, filed on Jul. 12, 2006.

(30) Foreign Application Priority Data

Jul. 13, 2005 (ES) .................. 200501698
Jun. 30, 2006 (ES) .................. 200601775

(51) Int. Cl.
*H01B 1/08* (2006.01)
*B05D 5/00* (2006.01)
*G01B 7/16* (2006.01)
*G01B 1/20* (2006.01)

(52) U.S. Cl. ............ 257/415; 252/500; 73/767; 73/774
(58) Field of Classification Search .............. 252/500; 361/749, 763; 73/760, 767, 774; 257/415; 345/174; 324/71.5
See application file for complete search history.

(56) References Cited

U.S. PATENT DOCUMENTS 6,469,267 B1    10/2002    Welsh et al.
(Continued)

FOREIGN PATENT DOCUMENTS

EP    1172831    1/2002
(Continued)

OTHER PUBLICATIONS

International Search Report for corresponding International Application PCT/ES2006/000398, mail date Jan. 4, 2007.

*Primary Examiner* — Mark Kopec
(74) *Attorney, Agent, or Firm* — Katten Muchin Rosenman LLP

(57) ABSTRACT

The present invention relates to large surface distributed pressure sensors comprising at least two flexible substrates, at least of one of these being entirely or partially coated by a layer of polythiophene containing repetitive structural units with formula (I),

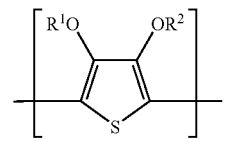

wherein $R^1$ and $R^2$ are independently a $C_1$-$C_{12}$ alkyl group or they form a $C_1$-$C_{12}$ 1,n-alkylene group, with n=1-12, optionally substituted by a $C_1$-$C_{12}$ alkyl group, $C_2$-$C_{12}$ alkene, vinylene, benzyl, phenyl group, a halogen atom, or by an ester, amine, amide or ether functional group, optionally substituted by a $C_1$-$C_{12}$ alkyl group; and one or more insulating spacers. Said sensors are flexible and easy to manufacture and they may present different symmetric, simple or multilayer configurations, as desired.

28 Claims, 5 Drawing Sheets

U.S. PATENT DOCUMENTS

| | | |
|---|---|---|
| 7,468,199 B2 * | 12/2008 | Divigalpitiya et al. ...... 428/40.1 |
| 7,671,849 B2 * | 3/2010 | Takei et al. ................... 345/173 |
| 2003/0205450 A1 | 11/2003 | Divigalpitiya et al. |
| 2004/0012570 A1 | 1/2004 | Cross et al. |
| 2005/0076824 A1 * | 4/2005 | Cross et al. ................... 116/205 |
| 2006/0145127 A1 | 7/2006 | Lockridge |
| 2006/0162464 A1 | 7/2006 | Hayashi et al. |
| 2008/0054875 A1 * | 3/2008 | Saito ............................ 324/71.5 |

FOREIGN PATENT DOCUMENTS

| | | |
|---|---|---|
| EP | 1447653 | 8/2004 |
| JP | 2006153471 | 6/2006 |

* cited by examiner

POLYTHIOPHENE-BASED LARGE SURFACE DISTRIBUTED PRESSURE SENSORS

This application is a continuation application of and claims priority to PCT/ES2006/000398, filed Jul. 12, 2006. PCT/ES2006/000398 claims priority to Spanish patent application P200501698, filed Jul. 13, 2005, and Spanish patent application P200601775, filed Jun. 30, 2006.

FIELD OF THE INVENTION

This invention relates to polythiophene-based distributed pressure sensors. More specifically, it relates to flexible sheets coated with polythiophene-like compounds and assembled in different configurations using suitable insulating spacers. Said configurations include the symmetric configuration, the simple configuration and the multilayer configuration, among others. The devices of the present invention are flexible, easy to manufacture and use polythiophene-type intrinsic conductive polymers as sensing elements.

BACKGROUND OF THE INVENTION

Distributed pressure sensors are useful to determine strength or pressure upon soft objects, e.g., to measure the interface pressures of a person sitting on a chair. For this application it is necessary for the sensor to be flexible in order to adjust to the shape of the chair curvature and to adequately measure the forces exerted. Moreover, the sensor must be thin enough as to not introduce reading errors. This type of sensor usually has a thickness comprised between 0.1 and a few millimeters. In order to measure pressure at different points on a surface, it is necessary that the sensor area of each element in the distributed sensor is as small as possible. In general, according to the number of sensor elements used, these are classified into: single sensors and sensor arrays of n×n elements. These can in turn be classified according to output signals into two (on-off) or more output sensors (analogue or digital sensors).

The performance required from flexible pressure sensors is usually less than that required from conventional rigid sensors, with measurement inaccuracies of between 5 and 10% being accepted. Flexible pressure sensors are usually made up of a series of rows and columns in matrix-type arrangements. Flexible pressure sensors of n×n sensor elements provide data on pressure distribution on $n^2$ areas of the sensor. This data is collected in the form of an electronic signal by converting the measurement of the change in resistance provided by the sensor element into voltage or intensity. The data thus obtained is linearized in order to optimize its resolution and simplify its interpretation. In order to increase measurement precision the different sensor elements are calibrated by adjusting the corresponding gains and offsets or by establishing calibration curves. Data treated in this way allows generating two- and three-dimensional pressure maps in real time.

Amongst the different technologies that exist for developing distributed pressure sensors we can mention: the technology using piezoelectric elements and pneumatic, hydraulic, resistive and capacitive technologies. Piezoelectric technology cannot be used for static measurements due to current loss in these sensors, which makes the response signal tend towards zero with time. Sensors based on pneumatic and hydraulic technologies require very complicated assemblies and large thicknesses, which limits their application in flexible sensors. Nowadays, resistive and capacitive technologies are the most used in flexible pressure sensors.

The operating principle of resistive sensors is based on the change in electric resistance that takes place in piezoresistive materials when a force or pressure is applied upon them. In the case of capacitive sensors, these are based on the change in capacitance that occurs between two parallel plates between which there is a nonconductive elastomeric material, when a force or pressure is applied upon them. This last type of sensors has the drawback of requiring very precise and highly sensitive and stable electronics, since the changes in capacitance measured are usually less than pico faradays. In contrast, resistive-type flexible pressure sensors use very simple electronics, since changes in resistance are of several orders of magnitude and fast, which is important for arrays of many sensor elements, and hardly sensitive to electromagnetic fields (another drawback of capacitive sensors). Amongst the disadvantages of these sensors we can highlight their non-linearity and the dependence of their response to the number of cycles and the history of the sensor. Moreover, the response of these sensors usually depends on temperature and the degree of relative humidity, and they can thus show low signal stability and a lifetime that is not sufficiently long.

In general, flexible pressure sensors existing on the market have a three-layer configuration with the outer layers made in a flexible material (fabric or polymer, patents U.S. Pat. Nos. 6,155,120 and 6,501,465) that is covered with conductive lines, usually metal wires (patent applications US 2003/0173195 and WO 99/39168) or conductive paste charged with metal particles (patents U.S. Pat. Nos. 6,646,540 and 6,291,568) or carbon black (patent U.S. Pat. No. 6,597,276 and patent application WO 00/25325), and the intermediate layer is made in a pressure-sensitive material, of the conductive ink type (patents U.S. Pat. Nos. 5,652,395 and 5,838,244) or a nonconductive dielectric elastomer (patent U.S. Pat. No. 5,010,774 and patent application WO 2004/061401).

The use of polythiophenes, a family of highly stable intrinsic conductive polymers that can be processed from aqueous dispersions, as active materials for the manufacture of distributed pressure sensors has not been described in the state of the art. Patents U.S. Pat. Nos. 4,959,430 and 4,987,042 describe different procedures for preparing dispersions based on poly (ethylene-dioxy-thiophene) and patents U.S. Pat. Nos. 5,766,515 and 5,370,981 their use as a transparent electrode in electroluminescent devices and to prepare anti-static plastics, respectively.

There is still a need therefore in the state of the art for alternative large surface distributed pressure sensors that overcome the drawbacks of the state of the art.

OBJECT OF THE INVENTION

The invention has as an object large surface distributed pressure sensors comprising at least two flexible substrates, at least of one of these being entirely or partially coated by a layer of polythiophene, and one or more insulating spacers.

Similarly, the invention has as an object a procedure for preparing said pressure sensors.

DETAILED DESCRIPTION OF THE INVENTION

The present invention provides a large surface distributed pressure sensor comprising at least two flexible substrates, at least of one of these being entirely or partially coated by a layer of polythiophene containing repetitive structural units with formula (I),

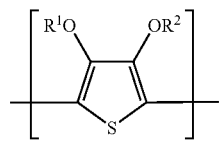

wherein $R^1$ and $R^2$ are independently a $C_1$-$C_{12}$ alkyl group or they form a $C_1$-$C_{12}$ 1,n-alkylene group, with n=1-12, optionally substituted by a $C_1$-$C_{12}$ alkyl group, $C_2$-$C_{12}$ alkene, vinylene, benzyl, phenyl group, a halogen atom, or by an ester, amine, amide or ether functional group, optionally substituted by a $C_1$-$C_{12}$ alkyl group;
and one or more insulating spacers.

Within the context of the invention, the term "large surface distributed pressure sensor" refers to a sensor that is capable of providing pressure measurements over a large surface (greater than 1 cm×1 cm) which may in turn be curved and flexible, in contrast to point pressure sensors.

A completely novel aspect of the present invention is the use of the polythiophenes described above (hereinafter "polythiophenes of the invention") as sensor elements. Thus, in a particular embodiment of the sensor of the invention, groups $R^1$ and $R^2$ of the polythiophene form an alkylene group chosen from methylene, 1,2-ethylene and 1,3-propylene. In a preferred embodiment said groups $R^1$ and $R^2$ form a 1,2-ethylene group, i.e. the preferred polythiophene for the embodiment of the sensor of the invention is poly(ethylene-dioxy-thiophene).

In another particular embodiment of the sensor of the invention, the flexible substrate is a flexible plastic sheet. In a preferred embodiment, the flexible plastic sheet is made of high melting point or high glass transition temperature polymers, preferably polyethylene terephthalate or polycarbonate. In another preferred embodiment, the flexible plastic sheet is made of plasticized PVC, thermoplastic rubbers, fibres or polymer fabrics.

In another particular embodiment of the sensor of the invention, the flexible substrate is a sheet of a non-plastic material.

In a preferred embodiment, the flexible substrate is a sheet of a cellulose derivative material, preferably a sheet of cellulose paper.

In another preferred embodiment, the flexible substrate is a sheet of a textile material.

In another preferred embodiment, the flexible substrate is a sheet of flexible glass.

Surprisingly, it has been found that when two flexible sheets coated with the polythiophenes of the invention come into contact such that both conductive films approach one another (using adequate insulating spacers) and a potential difference is established between them, the electric current passing through is directly proportional to the pressure exerted upon the sheets in a given range of pressures until, at very high pressures, the electric current saturates into a constant value.

Figure 1:
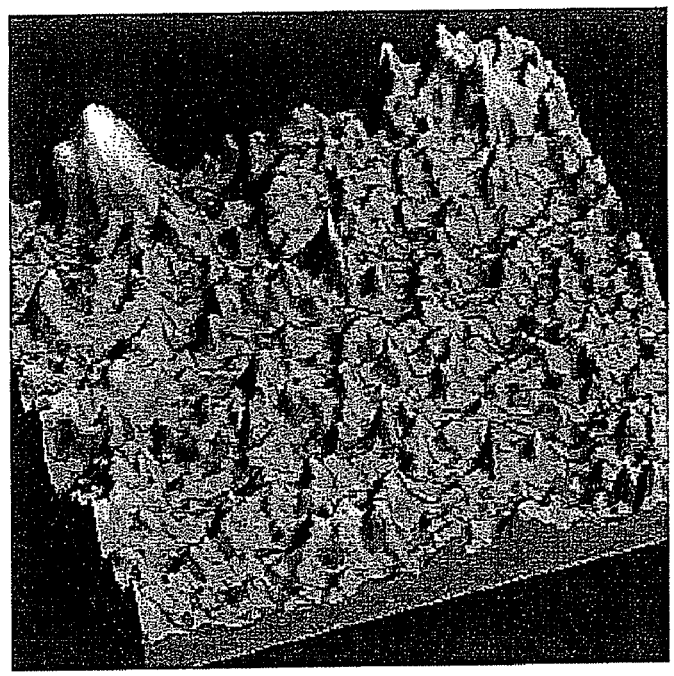
FIG. 1 shows an atomic force microscopy (AFM) photograph of the surface of a polythiophene-type conductive polymer and a graph of micro-roughness statistics.
Figure 1:
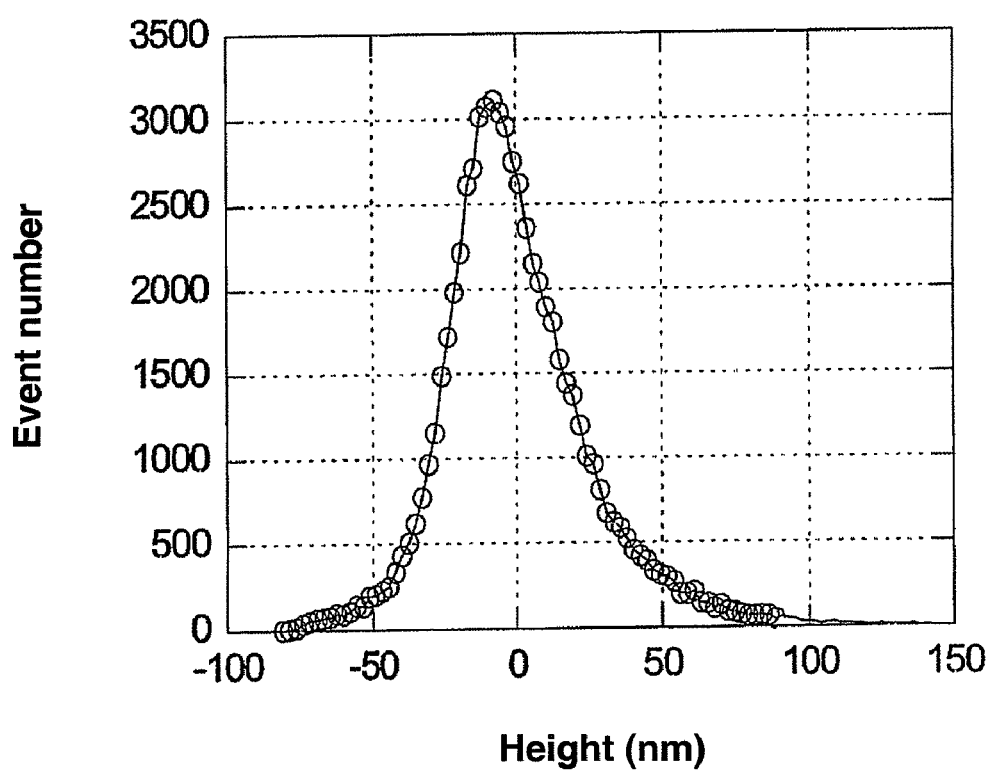

This effect, which is used in the present invention for the manufacture of distributed pressure sensors based on the polythiophenes described, could be attributed to the rough (and at the same time viscoelastic) nature, at the nanometer level, of the conductive films used, as shown in FIG. 1, performed by atomic force microscopy (AFM). Said morphology would include conductive particles (electron conductivity) of the polythiophene together with relatively insulating areas of a polyanion used as a dopant, as described below. We can thus think that when the pressure upon the polythiophene-coated sheets increases the number of conductive contact points, at a nanometer scale, will increase until a certain pressure at which the maximum possible number of contact points is reached, and therefore, the value of the electric current becomes saturated. When the pressure is withdrawn, due to the viscoelastic nature of the material, it would return to approximately the original state in the absence of pressure.

In order to prevent short-circuits (in the absence of pressure) it is convenient to use insulating spacers when assembling the distributed pressure sensors of the present invention, as well as to adjust the pressure range in which the sensors respond within linearity. Said spacers will preferably be made in materials of a suitable elastic module to cover a determined range of pressures such that the range of pressure the sensor is capable of detecting can be controlled according to its thickness and viscoelastic properties.

Thus, in a preferred embodiment the insulating spacer is a silicone, a polymeric foam or an epoxy resin.

As has been mentioned, said polythiophenes in their oxidised state may additionally incorporate anionic groups that stabilise the delocalised positive charge carriers in the polymer chains. Thus, in a particular embodiment of the sensor of the invention, the polythiophene incorporates an anionic dopant. In a preferred embodiment, said anionic dopant is an inorganic anion, preferably a sulphate, chloride or bromide anion. In another preferred embodiment, said anionic dopant is an organic anion with sulphonate or phosphate groups, preferably a p-toluenesulphonic or p-toluene-phosphonic acid. In another preferred embodiment, said anionic dopant is an organic polyanion chosen from polymeric carboxylic acids, preferably poly(acrylic acid), poly(methacrylic acid) or poly(maleic acid); polymeric sulphonic acids, preferably poly(styrene sulphonic) acid or poly(vinyl sulphonic) acid; or copolymers of vinyl carboxylic and vinyl sulphonic acids with other polymerizable monomers, preferably styrene and acrylic or methacrylic monomers. In an even more preferred embodiment, the molecular weight of said polyanions will be comprised, preferably, between 15,000 and 300,000 Daltons.

Figure 2:
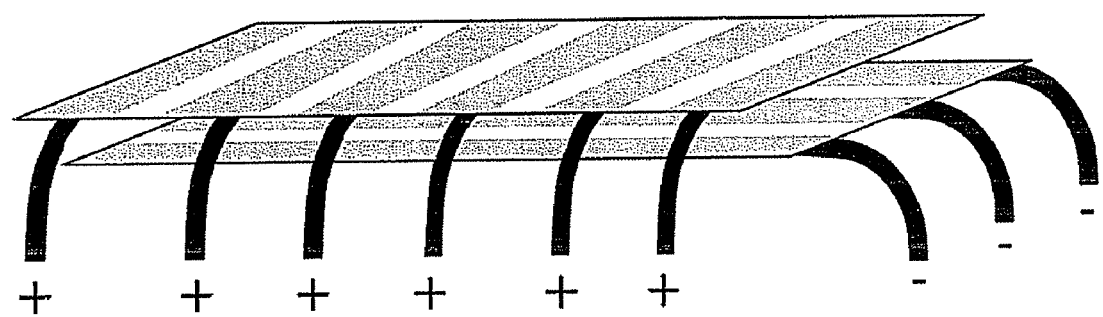
FIG. 2 shows a schematic diagram of the symmetric configuration of a pressure sensor according to the invention in which the white lines represent nonconductive insulating spacers separating polythiophene conductive tracks.

With respect to the possible configurations in which the present invention may be performed, the most simple one is the symmetric configuration formed by two identical flexible sheets on which the polythiophene conductive tracks have been deposited, separated regularly by insulating spacers, and which are placed perpendicularly between them. In this case the height of said spacers must be greater than that of the polythiophene conductive tracks. As indicated above, the nonconductive insulating spacers have the function of preventing electric contact between the conductive tracks of both sheets, once these have been assembled sandwich-like, and optionally encapsulated, in the absence of pressure, when a current intensity is applied between the top and bottom sheets, as shown in FIG. 2.

The pressure sensor thus constructed provides an electric signal that is proportional to the pressure applied and its matrix arrangement (n rows×n columns) allows obtaining pressure distribution data on $n^2$ areas of the sensor. Moreover, the range of pressure it is capable of detecting can be modified depending on the viscoelastic properties of the spacer used.

A variant of the previous configuration is the substitution of one of the sheets containing polythiophene conductive tracks with conductive tracks made from the deposition of any other conductive material. Thus, in another particular embodiment of the sensor of the invention, it shows a simple configuration formed by a flexible sheet on which polythiophene conductive tracks have been deposited, separated regularly with insulating spacers, and a nonconductive flexible sheet on which tracks have been deposited of another conductive material which, in another preferred embodiment, form two electrodes.

Within the context of the invention the term "conductive material" refers to a metal material (silver, copper, nickel, etc.) of the type conductive silver paste, graphite paste, copper, or an intrinsic conductive polymer of the type polypyrrole, polyaniline or polythiophene deposited from a solution or a dispersion.

Other configurations gathered in the present invention are those using sheets with a homogenous deposition of polythiophenes (a film, for example) upon them.

Thus, in a particular embodiment of the invention, the sensor has a three-layer configuration formed by a flexible sheet upon which a homogeneous conductive layer of polythiophene is deposited, a nonconductive flexible sheet upon which tracks of a conductive material have been deposited and a deposition of an insulating spacer upon the conductive sheet of polythiophene.

In another particular embodiment, the sensor has a three-layer configuration formed by a flexible sheet upon which a homogeneous conductive layer of polythiophene is deposited, a nonconductive flexible sheet upon which tracks of a conductive material have been deposited and a deposition of an insulating spacer upon the nonconductive sheet with tracks of conductive material.

Said configurations have a multilayer structure formed by a sheet with a homogenous deposition of polythiophenes, a non-homogeneous electric insulating layer or insulating spacer and a sheet with conductive tracks performed from the deposition of any conductive material which, in particular, can form two electrodes. The electric insulating layer can be performed by the deposition of any nonconductive material or of high electric resistance upon any of the other layers and it can have different configurations, thicknesses and viscoelastic coefficients that allow the adaptation and optimisation of the measurement range of the sensor, according to that described above.

In another aspect of the invention, it provides a procedure for preparing a large surface distributed pressure sensor according to that described above, wherein the polythiophene is totally or partially deposited upon the flexible substrate, in the form of a film or in the form of tracks, for example, as mentioned above.

The polythiophenes used in the present invention have film-forming capacity when applied from true solutions, colloidal dispersions or stable dispersions of finely divided particles, either aqueous or solvent-based, by oxidative polymerisation of the corresponding monomer or by in situ polymerisation methods upon the substrate such as those described in the reference ADVANCED FUNCTIONAL MATERIALS 14, 615-622, 2004. Amongst the preferred solvents are alcohols, methanol, ethanol and isopropanol, as well as mixtures of water with these alcohols or other water-miscible organic solvents such as acetone. Amongst the preferred oxidizing agents are ammonium persulphate, iron trichloride and iron tosylate. Additionally, polymeric binders of the type poly(vinyl alcohol), poly(vinyl acetate), etc. may be used and adhesion promoters of the type silanes, tackifying resins, etc. to facilitate the formation of highly adherent films upon the substrate.

Thus, in a particular embodiment of said procedure, the polythiophene is deposited as a film from true solutions, colloidal dispersions or stable dispersions of finely divided particles, either aqueous or solvent-based, by means of oxidative polymerisation of the corresponding polythiophene monomer. In a preferred embodiment thereof a polymeric binder of the type poly(vinyl alcohol) or poly(vinyl acetate) and an adhesion promoter of the type silanes or tackifying resins are used in order to facilitate the formation of a highly adherent film upon the flexible substrate.

In another particular embodiment of said procedure, the polythiophene is deposited upon the flexible substrate as a film from true solutions, colloidal dispersions or stable dispersions of finely divided particles, either aqueous or solvent-based, by means of in situ polymerisation methods upon said substrate.

The forms of application upon flexible substrates can be by direct evaporation of the solvent once the dispersion or solution are extended thereon (painted), by immersion, spraying, spin-coating techniques, etc.

Thus, in another particular embodiment of said procedure, the polythiophene solution or dispersion is applied upon the flexible substrate by painting, immersion, spraying or spin-coating techniques, and subsequent direct evaporation of the solvent.

In another particular embodiment of said procedure, the polythiophene is deposited upon the flexible substrate as tracks using conventional methods of lithography, selective deposition of the conductive polymer as tracks by ink-jet printing or by stripping the conductive material from the flexible sheet by mechanical methods, preferably by milling.

In a preferred embodiment, the conductive tracks form 2n electrodes corresponding to n sensors.

The present invention is illustrated below with three examples, which in no case must be considered limiting of the scope thereof.

EXAMPLE 1

Figure 3:
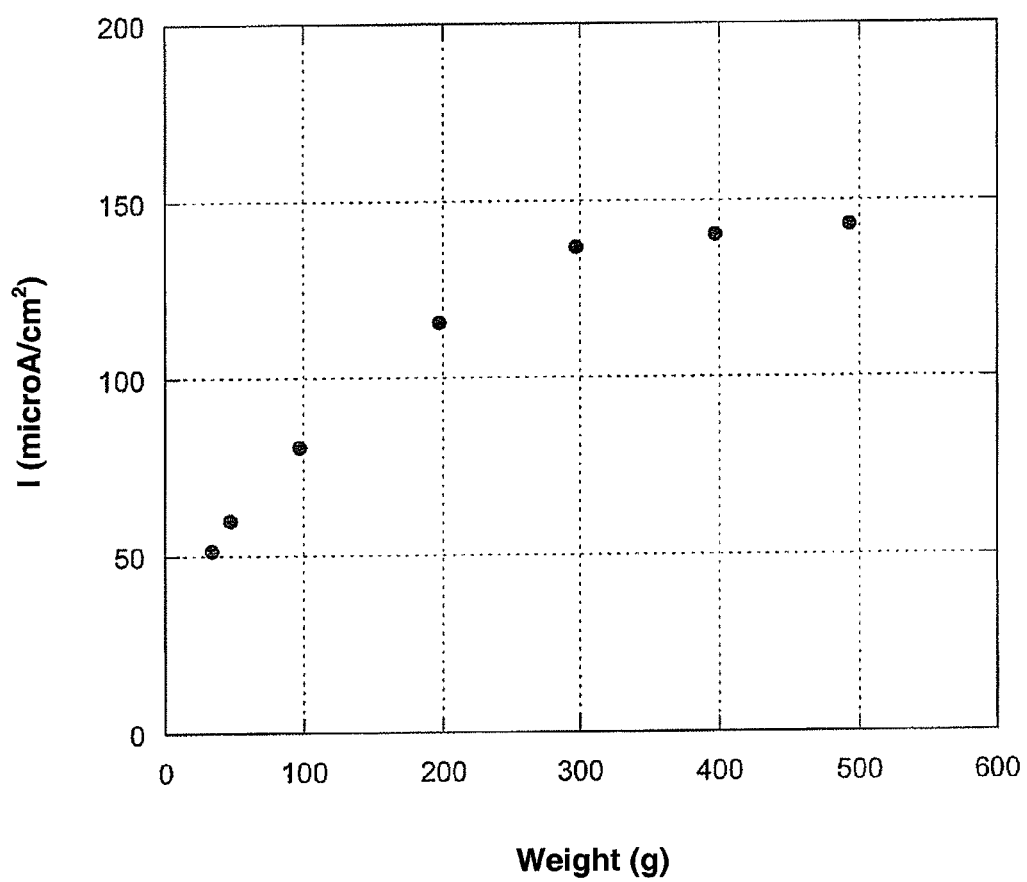
FIG. 3 shows a graph for the response in the form of current intensity for the symmetric configuration pressure sensor of the invention described in Example 1 versus the weight applied.

Preparation of a Pressure Sensor Based on a Symmetric Configuration of 5 cm×5 cm of Active Area A pressure sensor was prepared from two flexible sheets of polyethylene terephthalate (PET) of 5 cm×5 cm of active area and 175 microns of thickness each, coated with a thin layer (1-2 microns) of poly(ethylene-dioxy-thiophene) containing as a polyanion a poly(styrene sulphonic) acid (PEDOT-PSS) deposited by oxidative polymerisation of the ethylene-dioxy-thiophene monomer in water, giving rise to a dispersion with a solid content of 2.5%. The sheets were assembled using an adhesive double-sided insulating spacer (IS) of 0.125 mm thickness in a symmetric sandwich-type configuration (PET/PEDOT-PSS/IS/PEDOT-PSS/PET), placing the spacer as a flat band 0.5 cm wide along the edges of the PEDOT-PSScoated sheets. The device thus assembled did not give any signs of current going through in the absence of pressure when a potential was applied between both sheets. Sensor response as current intensity measured when applying different weights upon the sensor surface and applying a potential difference of 1 V between both sheets is illustrated in FIG. 3.

EXAMPLE 2

Figure 4:
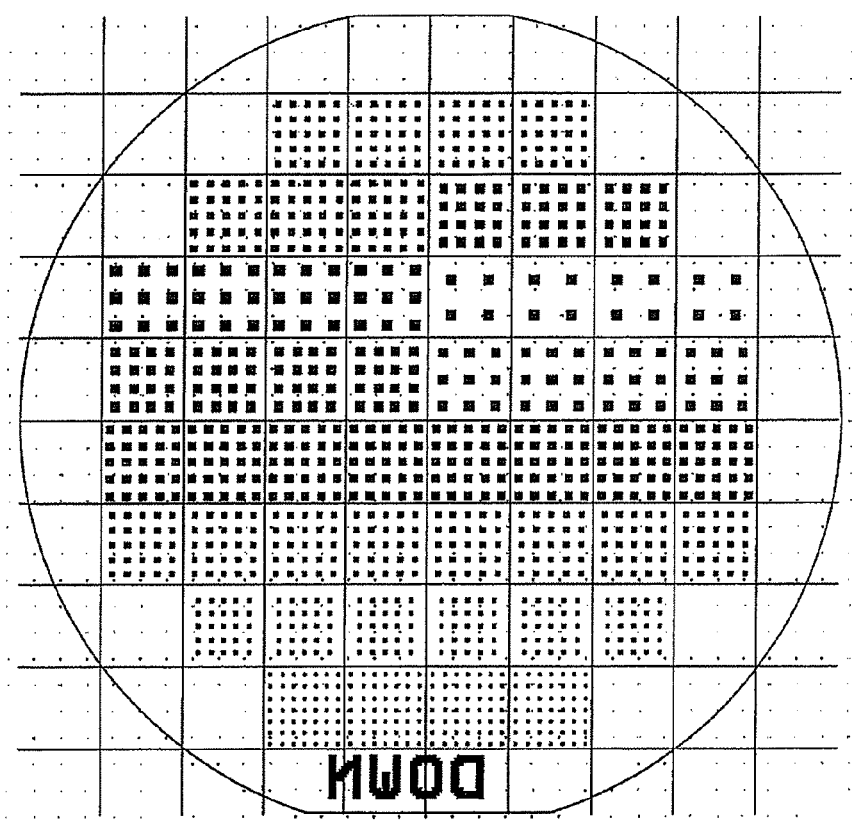
FIG. 4 represents different matrices of epoxy resin points that are useful for building the simple configuration pressure sensor of the invention described in Example 2.
Figure 5:
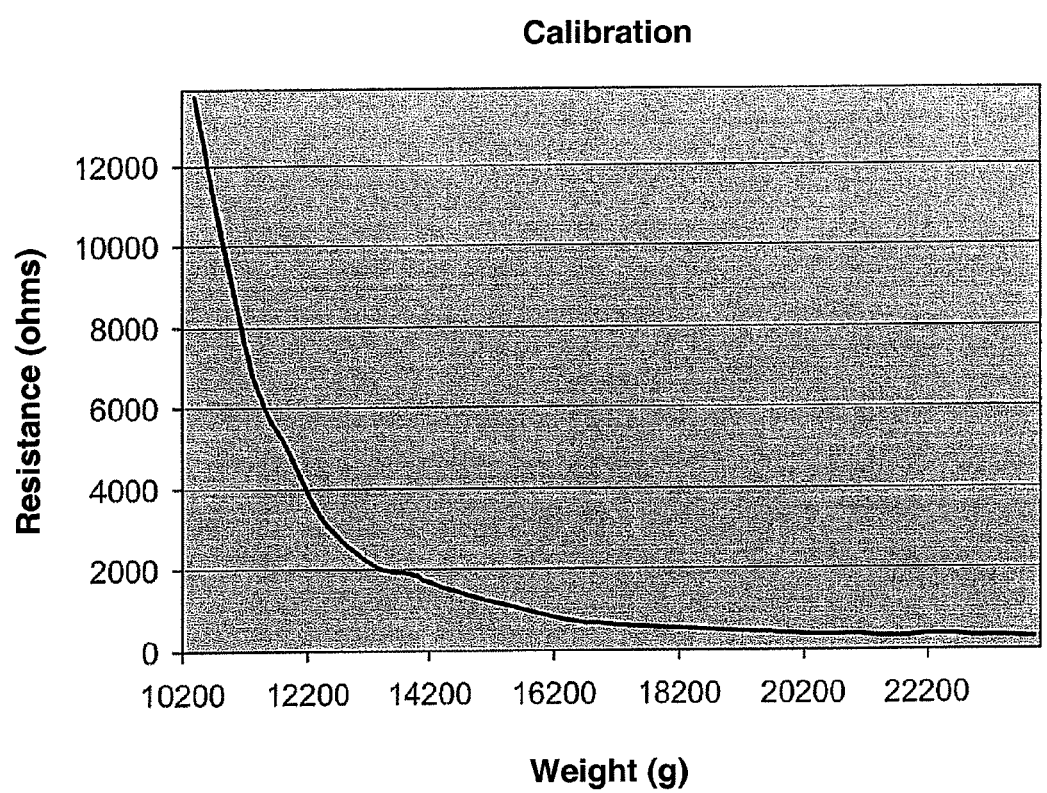
FIG. 5 represents the change in resistance for the simple configuration pressure sensor of the invention described in Example 2 according to the weight applied.

Preparation of a Pressure Sensor Based on a Simple Configuration of 1 cm×1 cm of Active Area A pressure sensor was prepared from one flexible sheet of polyethylene terephthalate (PET) of 1 cm×1 cm of active area and 175 microns of thickness each, coated with a thin layer (1-2 microns) of poly(ethylene-dioxy-thiophene) containing as a polyanion a poly(styrene sulphonic) acid (PEDOT-PSS) deposited by oxidative polymerisation of the ethylene-dioxy-thiophene monomer in water, giving rise to a dispersion with a solid content of 2.5%. A matrix of points of epoxy resin was deposited upon this sheet with one of the configurations shown in FIG. 3 (thickness 15 microns). Another flexible sheet (polyester) upon which two electrodes of conductive material (silver) were deposited was adhered to the sample thus obtained. The assembled device showed very high electric resistance between the two electrodes (MΩs). The change in resistance of the sensor when applying different weights upon the surface thereof is illustrated in FIG. 4.

EXAMPLE 3

Preparation of a Pressure Sensor Based on a Symmetric Configuration of 5 cm×5 cm of Active Area A pressure sensor was prepared from two flexible sheets of cellulose paper (CP) of 5 cm×5 cm of active area and 105 microns of thickness each, coated with a thin layer (1-2 microns) of poly(ethylene-dioxy-thiophene) containing as a polyanion a poly(styrene sulphonic) acid (PEDOT-PSS) deposited by oxidative polymerisation of the ethylene-dioxy-thiophene monomer in water, giving rise to a dispersion with a solid content of 2.5%. The sheets were assembled using an adhesive double-sided insulating spacer (IS) of 0.125 mm thickness in a symmetric sandwich-type configuration (CP/PEDOT-PSS/IS/PEDOT-PSS/CP), placing the spacer as a flat band 0.5 cm wide along the edges of the PEDOT-PSS-coated sheets. The device thus assembled did not give any signs of current going through in the absence of pressure when a potential was applied between both sheets. Sensor response as current intensity measured when applying different weights upon the sensor surface and applying a potential difference of 1 V between both sheets was similar to that obtained by the sensor in Example 1.

The invention claimed is:
1. A large surface distributed pressure sensor for distinguishing a plurality of magnitudes of a pressure on a sensor area of at least 1 cm×1 cm, the large surface distributed pressure sensor comprising:
a first flexible substrate and a second flexible substrate, the first flexible substrate being partially coated by a layer of polythiophene comprising repetitive structural units with formula (I),

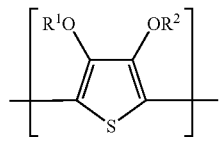

wherein
$R^1$ and $R^2$ are independently a $C_1$-$C_{12}$ alkyl group or $R^1$ and $R^2$ form a $C_1$-$C_{12}$ 1,n-alkylene group, n=1-12, optionally substituted by a $C_1$-$C_{12}$ alkyl group, $C_2$-$C_{12}$ alkene, vinylene, benzyl, phenyl group, a halogen atom, or by an ester, amine, amide or ether functional group, optionally substituted by a $C_1$-$C_{12}$ alkyl group; and
an insulating spacer.

2. A large surface distributed pressure sensor according to claim 1, wherein the $R^1$ and $R^2$ groups of the polythiophene form an alkylene group selected from the group consisting of methylene, 1,2-ethylene and 1,3-propylene.

3. A large surface distributed pressure sensor according to claim 2, wherein the $R^1$ and $R^2$ groups of the polythiophene form a 1,2-ethylene group.

4. A large surface distributed pressure sensor according to claim 1, wherein the first flexible substrate is a flexible plastic sheet.

5. A large surface distributed pressure sensor according to claim 4, wherein the flexible plastic sheet comprises polymers with a high melting point or a high glass transition temperature, preferably polyethylene terephthalate or polycarbonate.

6. A large surface distributed pressure sensor according to claim 4, wherein the flexible plastic sheet is selected from the group consisting of plasticized PVC, thermoplastic rubbers, fibres or polymer fabrics.

7. A large surface distributed pressure sensor according to claim 4, wherein the flexible plastic sheet comprises polyethylene terephthalate or polycarbonate.

8. A large surface distributed pressure sensor according to claim 1, wherein the first flexible substrate comprises a sheet of a non-plastic material.

9. A large surface distributed pressure sensor according to claim 1, wherein the first flexible substrate is selected from the group consisting of a sheet of a cellulose derivative material, a sheet of cellulose paper, a sheet of a textile material, or a sheet of flexible glass.

10. A large surface distributed pressure sensor according to claim 1, wherein the insulating spacer is a silicone, a polymeric foam or an epoxy resin.

11. A large surface distributed pressure sensor according to claim 1, wherein the polythiophene incorporates an anionic dopant.

12. A large surface distributed pressure sensor according to claim 11, wherein the anionic dopant is an inorganic anion.

13. A large surface distributed pressure sensor according to claim 11, wherein the anionic dopant is an organic anion with sulphonate or phosphate groups.

14. A large surface distributed pressure sensor according to claim 11, wherein the anionic dopant is an organic polyanion chosen from
polymeric carboxylic acids;
polymeric sulphonic acids; or
copolymers of vinyl carboxylic and vinyl sulphonic acids with other polymerizable monomers.

15. A large surface distributed pressure sensor according to claim 14, wherein the polyanion comprises a molecular weight comprised between 15,000 and 300,000 Daltons.

16. A large surface distributed pressure sensor according to claim 11, wherein the anionic dopant comprises a sulphate anion, chloride anion, or a bromide anion.

17. A large surface distributed pressure sensor according to claim 11, wherein the anionic dopant comprises a p-toluene-sulphonic or p-toluene-phosphonic acid.

18. A large surface distributed pressure sensor according to claim 11, wherein the anionic dopant is an organic polyanion chosen from
    poly(acrylic acid), poly(methacrylic acid) or poly(maleic acid);
    poly(styrene sulphonic) acid or poly(vinyl sulphonic) acid; or
    styrene and acrylic or methacrylic monomers.

19. A large surface distributed pressure sensor according to claim 1, wherein the first flexible substrate and the second flexible substrate comprises identical flexible sheets, each flexible sheet comprising a deposition of polythiophene conductive tracks, the tracks separated regularly by insulating spacers, and the spacers being placed perpendicularly between the tracks.

20. A large surface distributed pressure sensor according to claim 1, wherein
    the first flexible substrate comprises a flexible sheet, the flexible sheet comprising a deposition of polythiophene conductive tracks have been deposited, the tracks separated regularly by insulating spacers, and the spacers being placed perpendicularly between the tracks, and
    the second flexible substrate comprises a nonconductive flexible sheet, nonconductive flexible sheet comprising a deposition of tracks of a conductive.

21. A large surface distributed pressure sensor according to claim 1, wherein
    the first flexible substrate comprising a flexible sheet, the flexible sheet comprising a deposition of a homogeneous conductive layer of polythiophene;
    the second flexible substrate comprising a nonconductive flexible sheet, the nonconductive flexible sheet comprising a deposition of tracks of a conductive material;
    an insulating spacer deposited upon the layer of polythiophene.

22. A large surface distributed pressure sensor according to claim 1, wherein
    the first flexible substrate comprising a flexible sheet, the flexible sheet comprising a deposition of a homogeneous conductive layer of polythiophene;
    the second flexible substrate comprising a nonconductive flexible sheet, the nonconductive flexible sheet comprising a deposition of tracks of a conductive material;
    an insulating spacer deposited on the nonconductive flexible sheet.

23. A method of making a large surface distributed pressure sensor,
    the large surface distributed pressure sensor for distinguishing a plurality of magnitudes of a pressure on a sensor area of at least 1 cm ×1 cm, the large surface distributed pressure sensor comprising
    a first flexible substrate and a second flexible substrate, the first flexible substrate being partially coated by a layer of polythiophene comprising repetitive structural units with formula (I),

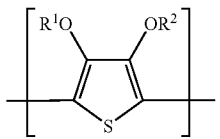

wherein,
    $R^1$ and $R^2$ are independently a $C_1$-$C_{12}$ alkyl group or $R^1$ and $R^2$ they form a $C_1$-$C_{12}$ 1,n-alkylene group, n=1-12, optionally substituted by a $C_1$-$C_{12}$ alkyl group, $C_2$-$C_{12}$ alkene, vinylene, benzyl, phenyl group, a halogen atom, or by ester, amine, amide or ether functional group, optionally substituted by a $C_1$-$C_{12}$ alkyl group; and
    an insulating spacer;
    the method comprising the step of:
    (a) depositing polythiophene on the first flexible substrate as a film from true solutions, colloidal dispersions or stable dispersions of finely divided particles, either aqueous or solvent-based, by oxidative polymerisation of the corresponding polythiophene monomer.

24. The method of claim 23, further comprising the step of
    (b) using a polymeric binder of the type poly(vinyl alcohol) or poly(vinyl acetate) and an adhesion promoter of the type silanes or tackifying resins to facilitate the formation of a highly adherent film upon the flexible substrate.

25. The method of claim 23, wherein step (a) is performed by painting, immersion, spraying or spin-coating techniques, and subsequent direct evaporation of the solvent.

26. The method of claim 23, wherein step (a) comprises depositing tracks using conventional methods of lithography, selective deposition of the conductive polymer as tracks by ink-jet printing or by stripping the conductive material from the flexible sheet by mechanical methods, preferably by milling.

27. The method of claim 26, wherein the tracks form 2n electrodes corresponding to n sensors.

28. A method of making a large surface distributed pressure sensor,
    the large surface distributed pressure sensor for distinguishing a plurality of magnitudes of a pressure on a sensor area of at least 1 cm×1 cm, the large surface distributed pressure sensor comprising
    a first flexible substrate and a second flexible substrate, the first flexible substrate being partially coated by a layer of polythiophene comprising repetitive structural units with formula (I),

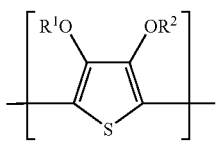

wherein
    $R^1$ and $R^2$ are independently a $C_1$-$C_{12}$ alkyl group or $R^1$ and $R^2$ they form a $C_1$-$C_{12}$ 1,n-alkylene group, n=1-12, optionally substituted by a $C_1$-$C_{12}$ alkyl group, $C_2$-$C_{12}$ alkene, vinylene, benzyl, phenyl group, a halogen atom, or by an ester, amine, amide or ether functional group, optionally substituted by a $C_1$-$C_{12}$ alkyl group; and
an insulating spacer;
the method comprising the step of:
depositing polythiophene on the first flexible substrate as a film from true solutions, colloidal dispersions or stable dispersions of finely divided particles, either aqueous or solvent-based, by in situ oxidative polymerisation methods upon said substrate.

* * * * *